United States Patent
Rydgren et al.

(10) Patent No.: US 7,305,258 B2
(45) Date of Patent: Dec. 4, 2007

(54) SPLIT BATTERY SUPPLY

(75) Inventors: Åke Rydgren, Södra Sandby (SE); Robert Westholm, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 55 days.

(21) Appl. No.: 10/531,223

(22) PCT Filed: Oct. 30, 2003

(86) PCT No.: PCT/EP03/11588

§ 371 (c)(1),
(2), (4) Date: Apr. 13, 2005

(87) PCT Pub. No.: WO2004/039046

PCT Pub. Date: May 6, 2004

(65) Prior Publication Data

US 2006/0046790 A1 Mar. 2, 2006

Related U.S. Application Data

(60) Provisional application No. 60/422,417, filed on Oct. 30, 2002.

(30) Foreign Application Priority Data

Oct. 22, 2002 (EP) ................................ 02445138

(51) Int. Cl.
*H04B 1/38* (2006.01)
*H04M 1/00* (2006.01)

(52) U.S. Cl. .................................. 455/573; 455/575.2

(58) Field of Classification Search ............. 455/569.1, 455/563, 575.1, 550.1, 66.1, 41.2, 90.3, 11.1, 455/573, 572, 572.2
See application file for complete search history.

(56) References Cited

U.S. PATENT DOCUMENTS

| | | | |
|---|---|---|---|
| 5,943,627 A | 8/1999 | Kim et al. | 455/569 |
| 6,230,029 B1 | 5/2001 | Hahn et al. | 455/575.2 |
| 2003/0040344 A1 * | 2/2003 | Shteyn et al. | 455/573 |
| 2004/0198470 A1 * | 10/2004 | Dyer et al. | 455/575.1 |
| 2004/0242264 A1 * | 12/2004 | Cho | 455/550.1 |

(Continued)

FOREIGN PATENT DOCUMENTS

GB 2 277 422 10/1994

(Continued)

OTHER PUBLICATIONS

International Preliminary Examination Report for PCT/EP03/11588, no date listed.

(Continued)

*Primary Examiner*—Naghmeh Mehrpour
(74) *Attorney, Agent, or Firm*—Myers Bigel Sibley & Sajovec, P.A.

(57) ABSTRACT

A headset system has a headset for direct wireless communication of audio data with a communication terminal and including a first power supply unit. The system includes a headset carrying device and a charger for charging the first power supply unit from a second poser supply unit. The headset carrying device includes the charger and the second power supply unit, and the headset carrying device is separate from the communication terminal.

22 Claims, 4 Drawing Sheets

U.S. PATENT DOCUMENTS

2005/0130593 A1* 6/2005 Michalak .................. 455/66.1
2005/0272477 A1* 12/2005 Boykins et al. .......... 455/569.1

FOREIGN PATENT DOCUMENTS

| JP | 9009382 | 1/1997 |
|----|---------|--------|
| WO | 99/0325 | 1/1999 |
| WO | 01/08386 | 2/2001 |
| WO | 02/39600 | 11/2001 |

OTHER PUBLICATIONS

International Search Report for PCT/EP03/011588 (WO 2004/039046 A3), no date listed.

* cited by examiner

SPLIT BATTERY SUPPLY

RELATED APPLICATIONS

The present application is a 35 U.S.C. §371 national phase application of PCT International Application No. PCT/EP03/011588, having an international filing date of Oct. 20, 2003 and claiming priority to European Patent Application No. 02445138.7, filed Oct. 22, 2002, and U.S. Provisional Application No. 60/422,417 filed Oct. 30, 2002, the disclosures of which are incorporated herein by reference in their entireties. The above PCT International Application was published in the English language and has International Publication No. WO 04/039046.

FIELD OF THE INVENTION

The present invention relates to a split battery supply for a cordless headset for wireless communication with a communication terminal. More particularly, it relates to headset system comprising such a headset and a headset carrying device, a headset for use in such a system, and a headset carrying device for use in such a system.

BACKGROUND

Since the end of the 20$^{th}$ century the cellular telephone industry has had enormous development in the world. From the initial analog systems, such as those defined by the standards AMPS (Advanced Mobile Phone System) and NMT (Nordic Mobile Telephone), the development has during recent years been almost exclusively focused on standards for digital solutions for cellular radio network systems, such as D-AMPS (e.g., as specified in EIA/TIA-IS-54-B and IS-136) and GSM (Global System for Mobile Communications). Different digital transmission schemes are used in different systems, e.g. time division multiple access (TDMA) or code division multiple access (CDMA). Currently, the cellular technology is entering the so called 3$^{rd}$ generation, providing several advantages over the former, 2$^{nd}$ generation, digital systems referred to above. Among those advantages an increased bandwidth will be provided, allowing effective communication of more complex data. The 3$^{rd}$ generation of mobile systems have been referred to as the UMTS (Universal Mobile Telephony System) in Europe and CDMA2000 in the USA, and is already implemented in Japan to some extent. Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure.

Accompanying the increase in use of portable communication terminals has been a desire for easy and convenient operation of these devices. In particular, manufacturers of mobile cellular radio telephones have long sought to provide efficient hands-free operation. In automobiles, for example, it is desirable to provide hands-free telephones for driver safety and convenience. With hands-free operation, the driver of a vehicle may use both hands to control the automobile.

One method of hands-free operation can be achieved by simply increasing the gain of the telephone's microphone and speaker to allow a user to speak and listen from some distance from the unit. Such a telephone is commonly referred to as a speakerphone. However, several problems are associated with a system constructed in this manner. For example, feedback and interference from ambient noise often make it difficult to clearly understand the words of the user. To help offset problems due to ambient noise, the microphone gain can be reduced by placing an external microphone connected via a wire to the main body of the radiotelephone close to the user's mouth. Nevertheless, the telephone speaker must still operate at high volume thereby diminishing the privacy of the received call.

Another solution is a headset with a microphone and a speaker, wherein a cable connects the headset to the main telephone apparatus. Although having improved performance and privacy, the headset must still be wired to the radiotelephone unit. Wire connections are often inconvenient, particularly for use with a portable radiotelephone.

For this reason, cordless headsets, communicating wirelessly with communication terminals, have been developed. In cordless headset systems of today, communication may be achieved e.g. by infrared radiation or radio transmission. Headsets have also been disclosed including bluetooth technology for short-range radio communication with a communication terminal, such as a mobile phone.

In order to operate the cordless or wireless headset, a power supply unit is needed. Since no cable is used, the power supply unit has to be contained in the headset, normally in the embodiment of a battery, which also means that the battery must be carried by the user when the headset is used. Consequently, portable cordless devices in general, and cordless headsets in particular, have strong and somewhat conflicting market requirements: They should be as small and light-weight as possible, and the battery should last for as long as possible. However, the skilled person realises that longer-lasting batteries are larger and/or heavier than shorter-lasting batteries, and the manufacturers will always strive to make their products smaller and smaller to attract more consumers. Obviously, the manufacturer that finds a solution to how to combine the smallest product with the highest battery time will have a huge competitive advantage, although most likely there always will be a compromise to some extent between size/weight and battery time.

One attempt to overcome the drawbacks of conventional headset solutions is disclosed in U.S. Pat. No. 5,590,417 to Rydbeck, incorporated herein by reference, which suggests wireless means for communicating between a headset and a portable radio telephone unit. Further, the headset operates in two modes. According to a first mode, the headset may be mounted on the radio telephone where it serves as a speaker and microphone. Also, the headset can be separated from the body of the radiotelephone and placed on the head of the user. In this mode of operation, the headset receives and transmits communication signals from and to the body of the radiotelephone during a call, thus providing hands-free operation. When mounted on the radio telephone a battery in the headset may be charged from the radio telephone. A drawback of this solution is that the headset needs to be stored attached to the phone. One of the basic ideas with cordless headsets is that the communication terminal, such as a mobile phone, may be kept in e.g. a bag or a pocket, whereas the headset is stored somewhere else where it is easily reached when needed.

Consequently, there is still a need for improvements in the art of cordless headsets, satisfying the market demands on dimensions, battery time and ease of use.

SUMMARY OF THE INVENTION

Hence, it is an object of the present invention to overcome the above-identified deficiencies related to the prior art.

According to a first aspect, this object is fulfilled by a headset system, comprising a headset for wireless communication of audio data with a communication terminal, said headset including a power supply unit, wherein a headset carrying device, separate from said communication terminal, comprises a charger for said power supply unit. This way low weight can be obtained for the headset, still maintaining a long battery time, by storing the headset in the headset carrying device when not used. Furthermore, with this solution the communication terminal, e.g. a phone, a computer or other apparatus communicatively connectable to the headset, does not have to be reached if only functions of the headset are to be used, basically voice communication. Also, since the headset carrying device does not necessarily have to include other elements than the charger and means for carrying and potentially protecting the headset, it can be suitably adapted for this purpose. Furthermore, it will not steal power from the communication terminal, which is undesirable since the terminal generally can be operated also without the headset. Another advantage obtained by the invention is that the headset and the charger headset does not have to be associated with a certain terminal. When incorporating transceiver means, capable of communicating with different terminals into the headset, such as when using bluetooth, it is clearly not very practical to have to charge the headset from one of those terminals.

In one embodiment, said headset carrying device comprises a protective casing for a headset stored therein. A headset is a device for which low weight is desirable, but at the same time it is generally made elongated to be able to extend from a user's ear down to or towards the user's mouth, when worn. This means that the headset often is a delicate device for which safe storage is desired. This embodiment brings about the further advantage that when the headset is not used and is placed in the protective casing, the power supply unit in the headset will at the same time be charged.

In one embodiment, said headset carrying device comprises attaching means for attaching to a user's body or clothes. This brings about the further advantage that the user can carry the cordless headset with him or her, even when not used at the same time as it is stored. Also this feature is advantageous when the headset is to be used for communication with different apparatuses, potentially placed in different locations, such as in different rooms, in the car, at home and at a work place. In an optional or alternative embodiment, said headset carrying device comprises attaching means for mechanically attaching the headset carrying device to a vehicle, and for electrically attaching the charger of the headset carrying device to a power supply of said vehicle. This way, it is possible to make use of e.g. a car battery to recharge the higher capacity charger of the headset carrying device, rather than the lower capacity power supply of the headset itself.

Preferably, said power supply unit of the headset is a re-chargeable battery. However, it may alternatively be a large-capacity capacitor. Furthermore, said charger is preferably a re-chargeable battery, but may likewise be a large-capacity capacitor. A combination of capacitor and battery is also possible. In one embodiment, the charger is connectable to a vehicle battery for recharging of the charger. Instead of a rechargeable battery or capacitor, the charger may alternatively comprise an exchangeable normal primary cell battery.

The headset system is preferably devised such that said power supply unit is dimensioned to last for a short period of use of communicating audio data, converting between audio data and audio signals, and conveying audio signals, before re-charging is necessary. Said short period may be in the range of zero to two hours, or e.g. in the range of thirty minutes to one hour, i.e. lasting for about one telephone call before re-charging of the power supply unit is needed. This way, the power supply unit can be made very small with low weight.

According to a second aspect, the stated object is fulfilled by a headset carrying device for carrying a headset when the headset is not in use, wherein said headset carrying device is separate from a communication terminal to which the headset is communicatively connectable, and in that it comprises an electrical charger and means for establishing electrical contact between the charger and a power supply unit of a headset carried by the headset carrying device, for charging the power supply unit from said charger.

Preferably, the headset carrying device comprises a protective casing for a headset stored therein.

In one embodiment, the headset carrying device comprises a casing for stowing a headset, which casing is transformable into a desktop mode for placing on a horizontal surface.

In one embodiment, the headset carrying device comprises attaching means for attaching the headset carrying device to a user's body or clothes. The headset carrying may also comprise attaching means for mechanically attaching the headset carrying device to a vehicle, and for electrically attaching the charger of the headset carrying device to a power supply of said vehicle.

Furthermore, the headset carrying device may comprise headset securing means for mechanically retaining a headset stored therein. Said headset securing means is preferably devised to maintain electrical contact between co-operating contacting means for said charger and said power supply unit.

According to a third aspect, the stated object is fulfilled by a headset for wireless communication of audio data with a communication terminal, said headset including a power supply unit, wherein said headset is attachable to a headset carrying device, separate from said communication terminal and including a charger for the power supply unit.

According to a fourth aspect, the stated object is fulfilled by a headset system, comprising a headset for wireless communication of audio data with a communication terminal, said headset including a power supply, wherein said power supply is split between a longer-lasting power supply device connectable to a mains outlet for re-charging, and a shorter-lasting power supply device connectable to said longer-lasting power supply device for re-charging, said shorter-lasting power supply device being included in the headset and said longer-lasting power supply device being included in a headset carrying device for storing the headset when not in use.

BRIEF DESCRIPTION OF THE DRAWINGS

The present invention will now be described in more detail with reference to preferred embodiments, given only by way of example and illustrated in the accompanying drawings, in which.

DETAILED DESCRIPTION OF PREFERRED EMBODIMENTS

The present description refers to cordless headsets for use as or with communication terminals. By headset is meant a device arranged to be worn by a user as a communication interface, including at least a speaker, a microphone, and means for communicating with a communication terminal by wireless transmission of audio data. Furthermore, the headset is arranged with some form of attaching means for positioning and retaining the headset in a preferred position on the user, with the speaker substantially placed at the user's ear and the microphone in the vicinity of the user's mouth. The headset may consequently include all the features for a communication terminal, such as a mobile phone, but may alternatively only constitute the audio interface for the user. The following description is directed to the latter embodiment, but the skilled person will realise that the present invention is equally applicable to the first embodiment.

Figure 2:
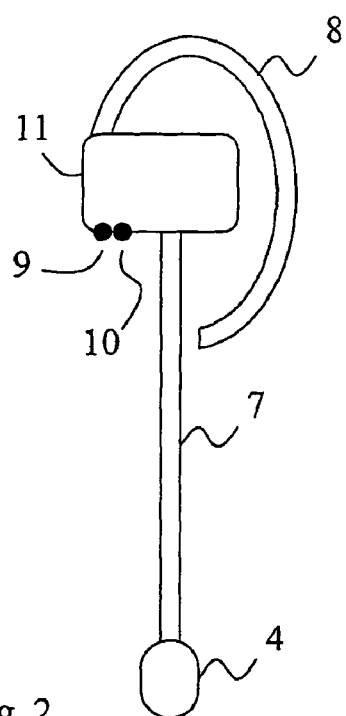
FIG. 2 schematically illustrates a cordless headset according to an embodiment of the invention.
Figure 7:
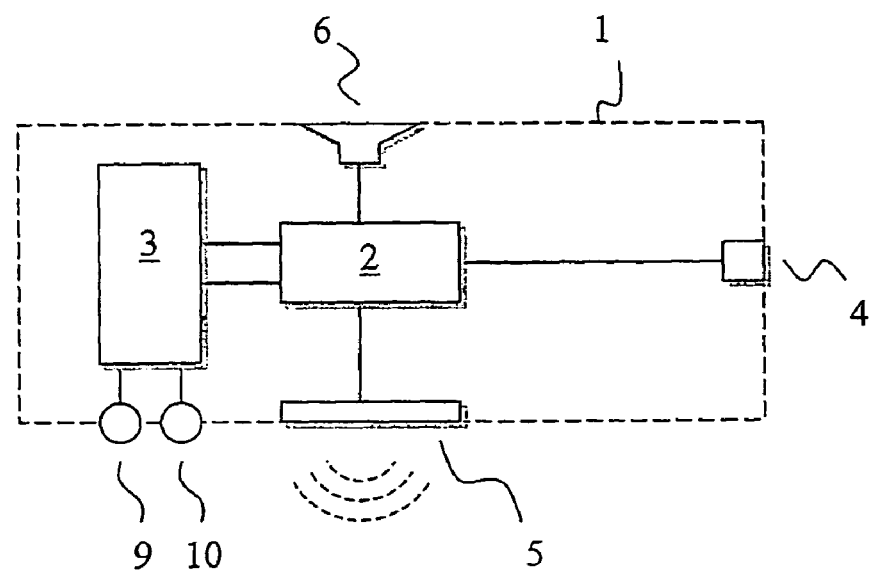
FIG. 7 schematically illustrates the circuitry for a headset according to an embodiment of the invention.

With reference to FIGS. 2 and 7, a cordless headset 1 is shown. A casing 11 carries the necessary electronics, and includes or is connected to an elongated member 7, devised to carry a microphone 4. A speaker 6 is supported in casing 11, though not shown in FIG. 2. The headset includes means 8 for attaching to a user, in the illustrated embodiment in the shape of an ear clip 8 designed to fit behind the ear lobe of a user. It should be noted that the particular implementation of the means for attaching the headset to a user is not crucial to the invention, whereas the illustrated example indicates a preferred embodiment. Straps or other means for attaching the headset 1 around the head may optionally be employed.

The headset 1 is used in combination with at least one communication terminal. Herein, the features of the invention are mainly described in conjunction with a headset 1 useable with a portable radio communication terminal, such as a mobile phone. However, the term communication terminal includes all mobile equipment devised for radio communication with a radio station, which radio station also may be mobile terminal or e.g. a stationary base station. Consequently, the term radio terminal includes mobile telephones, pagers, communicators, electronic organisers, smartphones, PDA:s (Personal Digital Assistants), vehicle-mounted radio communication devices, or the like, as well as portable laptop computers devised for wireless communication in e.g. a WLAN (Wireless Local Area Network). Furthermore, the term radio terminal should also be understood as to include any stationary device arranged for radio communication, such as a mobile network beta station, a PSTN (Public Switched Telephone Network) telephone, an IP phone, desktop computers, printers, fax machines and so on, devised to operate with radio communication with each other or some other radio station, and wherein an audio interface for speaking or listening is useable. Transmission between the headset and the communication terminal may of course be of any wireless application, which besides radio e.g. includes infrared light. Furthermore, it should be emphasised that the term comprising or comprises, when used in this description and in the appended claims to indicate included features, elements or steps, is in no way to be interpreted as excluding the presence of other features elements or steps than those expressly stated.

FIG. 7 illustrates the circuitry of the headset 1, although further elements than those disclosed may be implemented. A transceiver device 2 is included for wirelessly transmitting and receiving audio data. For the case of a radio transmitting and receiving headset 1, the transceiver device 2 comprises or is connected to an antenna 5. In an embodiment making use of infrared transmission (not shown) the transceiver is preferably connected to a light emitter and a light detector, e.g. a light emitting diode LED and a photodiode. The audio data is conveyed between a communication terminal and the headset 1, generally as a modulated carrier signal in e.g. radio or infrared. An audio converter is therefore further included in the transceiver device 2 of the headset 1, for converting between audio data and audio signals, such as speech. The transceiver device 2 is connected to a speaker 6 and a microphone 4. A power supply unit 3 supplies electrical energy to the electronics of the headset 1. In order to be able to charge the power supply unit, connectors 9,10 are coupled to the power supply unit 3, and preferably accessible from outside the casing 11. As will be further described below, the power supply unit 3 may be recharged when the headset is attached to a separate charger. As an alternative to direct electrical connection through connectors 9,10, means may be provided for inductively coupling energy to the power supply unit 3. Such inductive coupling devices are well known and used in many rechargeable products to eliminate the direct electrical contact. An inductive coupler may be desirable in that the possibility of failure of the contact, either mechanically or due to environmental contamination, can be avoided. The power supply unit 3 is preferably a rechargeable battery, but may also be a capacitor.

In one embodiment, the transceiver device 2 of the headset 1 includes a transmitter and a receiver, which allow for duplex communication with a communication terminal. The headset 1 also includes a transmitting and receiving element, such as the antenna 5, for transmitting and receiving signals from the communication terminal. For RF (Radio Frequency) signals, the antenna may be a small coil or wire or a flat pattern of conductive material, disposed within the body of the headset, or it may be located in the ear clip 8. In a preferred embodiment the transceiver 2 and antenna 5 may be devised according to the bluetooth technique for short-range radio communication. The receiver detects and demodulates the signal from the antenna to produce an audio signal. Several types of modulation may be employed including frequency modulation (FM), pulse width modulation (PWM), amplitude modulation (AM), single sideband AM, quadrature phase shift keying (QPSK), etc. The audio signal produced by the receiver is passed to an audio amplifier and to the speaker 6. The microphone 4 converts speech uttered by a user of the headset 1 into electrical signals that preferably are supplied to a bandpass filter of the transceiver device 2 for reducing extraneous noise. The output of the filter may be amplified by a suitable amplifier, the output of which is provided to the transmitter of the transceiver device 2. The transceiver 2 modulates an RF carrier with amplified output. It will be appreciated that the transceiver 2 may also include suitable audio signal conditioning components. In either embodiment, a modulated carrier is coupled to the antenna 5 which radiates for reception in a communication terminal.

It should be pointed out that the present invention is equally applicable to a headset only devised for transmission, carrying only a microphone but no speaker, and correspondingly to a headset only devised for reception, carrying only a speaker but no microphone.

Figure 1:
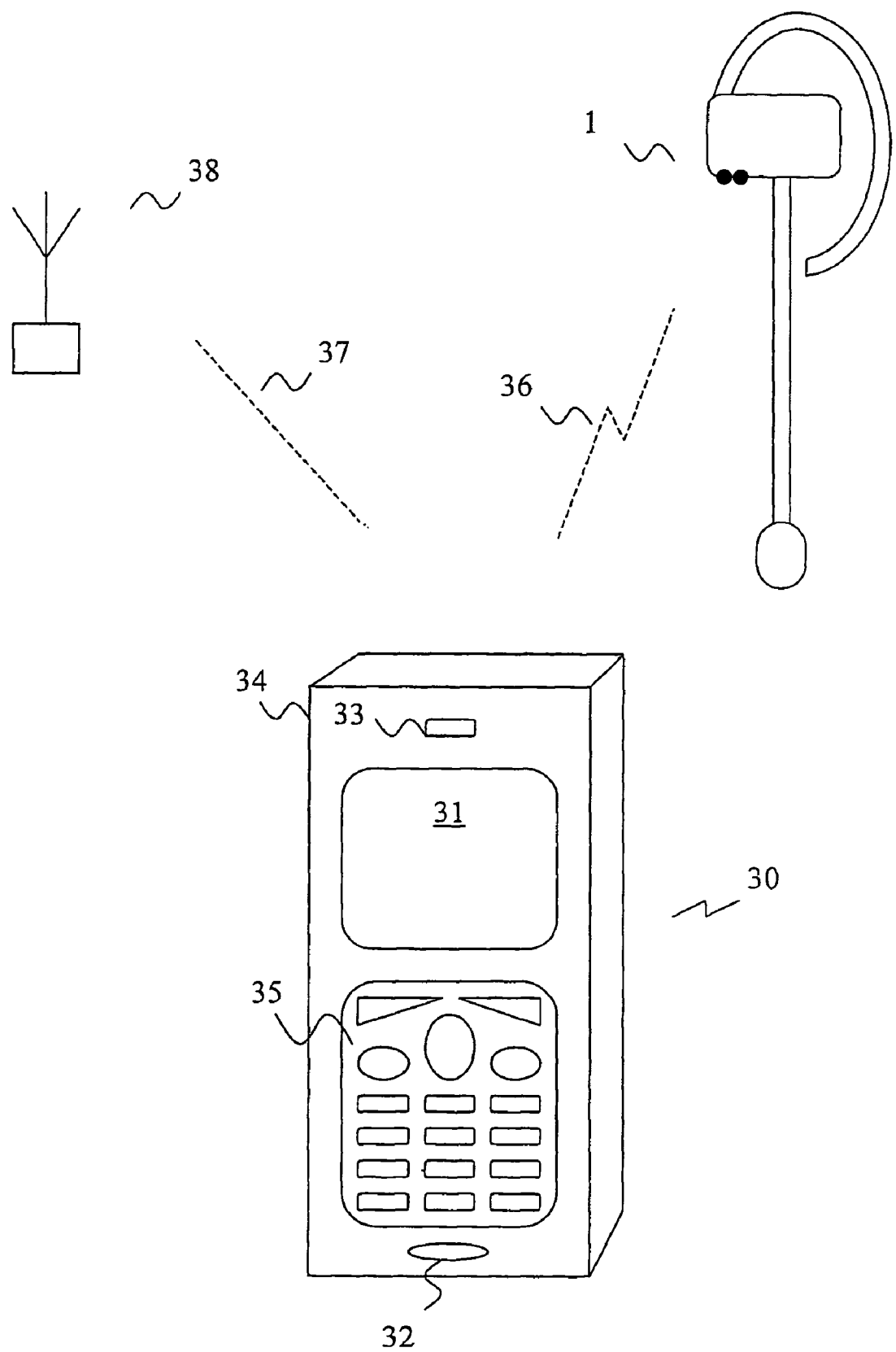
FIG. 1 schematically illustrates a wireless communication system and a cordless headset for a radio communication terminal, according to an embodiment of the invention.

FIG. 1 illustrates a typical arena for the present invention, wherein a headset 1 is useable for conveying audio data to and from a radio telephone 30 over a first type transmission link 36. The radio telephone 30, as such, communicates with base stations 38 of a mobile telephone system, over a second type transmission link. The communication terminal is disclosed in the embodiment of a cellular mobile phone 30 devised for radio communication. The terminal 30 comprises a chassis or housing 34, carrying a user audio input in the form of a microphone 32 and a user audio output in the form of a loudspeaker 33 or a connector to an ear piece (not shown). A set of keys, buttons or the like constitutes a data input interface 35, and is usable e.g. for dialling, according to the established art. A data output interface comprising a display 31 is further included, devised to display communication information, address list etc in a manner well known to the skilled person. The radio communication terminal 30 includes radio transmission and reception electronics (not shown), and is devised with an antenna, such as a traditional stub antenna or a built-in low profile antenna device inside the housing 34, for communicating with a base station 38 by over an air interface, e.g. defined by GSM, UMTS or CDMA2000. In the illustrated embodiment, the terminal 30 is fully operational without the headset 1, by carrying its own audio interface 32,33. In an alternative embodiment, the terminal may lack either speaker 33 or microphone 32, or both, only being useable for conveying audio signals by use of the headset 1.

The communication between the headset 1 and the terminal 30 is preferably achieved by a transmission interface which is different from that of the communication between the terminal 30 and the network base stations 38. Bluetooth has been mentioned as one embodiment, which makes use of a separate radio band for short-range communication. Other types of interfaces for wireless communication may be used though, and the details thereof are not important for the understanding or implementation of the present invention.

For convenient use, the headset should be as small and light weight as possible. With this object at hand, the present invention suggests the use of split battery configuration for the headset 1, as illustrated in FIGS. 2-5 and 8-11. A small, low-capacity rechargeable power supply unit 3 is implemented in the headset 1, as previously described in conjunction with FIG. 7. A second power supply 41 is implemented in a separate headset carrying device 40. The second power supply unit 41 is preferably also rechargeable, but is also devised as a charger for the first power supply unit 3 of the headset 1. In an alternative embodiment a normal primary cell battery is used as the second power supply, i.e. the charger. Such primary cells are readily available in stores, such as supermarkets and gasoline stations. Thanks to the split battery supply, a minimum battery weight can be implemented in the headset 1, minimising the weight that has to be carried on the user's head during use. When not used, the headset 1 is stowed in the headset carrying device 40, wherein the headset 1 is charged by the charger 41. For this reason the headset carrying device 40 comprises charger contacts 42,43, for electrical contact with the co-operating power supply unit contacts 9,10. Alternatively, an induction solution, as already noted, may be implemented instead of a direct electrical contact arrangement. The second power supply unit or charger 41 is preferably a rechargeable battery, but may also be a large-capacity capacitor.

The charger 41 of the headset carrying device 40 is preferably connectable to another means for recharging the charger 41, e.g. by connection to a mains outlet. The connection can be obtained by wire connection, or e.g. through a mains-connected docking station, in which the headset carrying device 40 is placed for re-charging.

Figure 3:
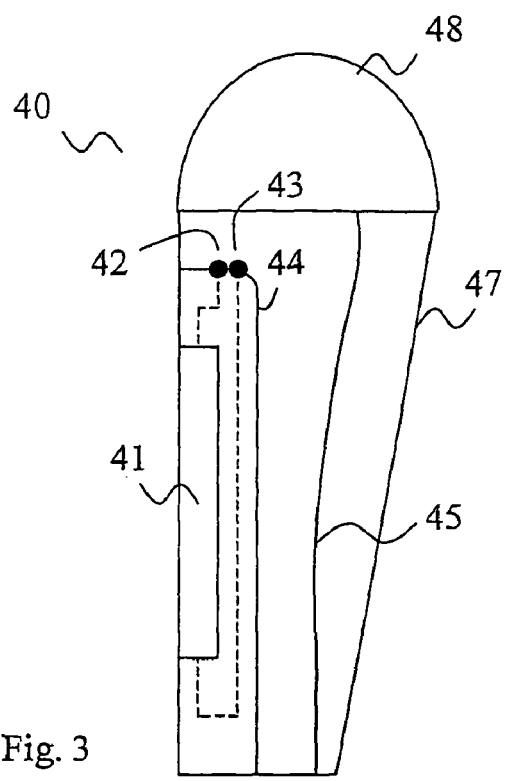
FIG. 3 schematically illustrates a headset carrying device according to an embodiment of the invention.
Figure 4:
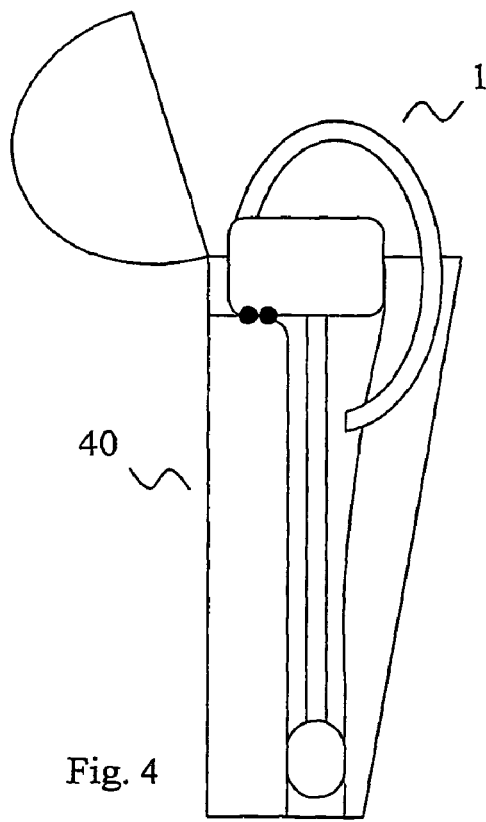
FIGS. 4 and 5 schematically illustrate the headset of FIG. 2 placed in the headset carrying device of FIG. 3.
Figure 5:
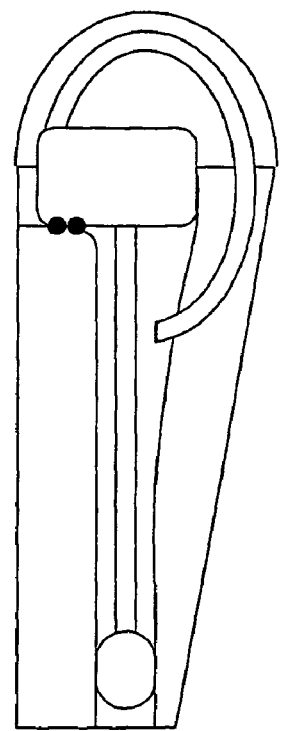

FIG. 3 illustrates an embodiment of the headset carrying device 40 by its own, also indicating the built-in charger 41. FIGS. 4 and 5 illustrate the headset carrying device 40 when carrying a headset 1, in a sectional view. In these two drawings the charger 41 has been left out for the purpose of making the figures more lucid. As indicated by the drawings, the headset carrying device 40 preferably comprises a protective casing. In the disclosed embodiments the protective casing includes a box 47 with a lid 48, pivotally hinged on the box. The interior of the protective casing further includes supporting portions 44,45 shaped to support and protect a headset stowed therein. An elongated bore 46 is shaped to receive the elongated member 7 of the headset 1, carrying the microphone 4. The supporting portions are further shaped to accommodate the ear clip 8. If not provided solely by the interconnection between the co-operating connections 9,10,42,43 between the headset power supply 3 and the charger 41, headset retaining means for holding the headset in place when stowed may be separately implemented. The headset retaining means may also be provided by shaped portions constituting a "click" lock, preferably by engagement between the headset casing 11 and the support portions 44,45, in manner similar to the interconnection between a pen and its cap. The headset carrying device 40 may also comprise means for attaching it to a user, e.g. a belt clip (not shown).

Dependent on how the headset is to be used, different sizes and capacities of the power supply unit 3 can be selected. In one embodiment, a power supply unit 3 having a battery time corresponding to about one average telephone call is implemented in the headset 1. Needless to say, the average time for one call varies between users, and in accordance with the invention, a user may select and implement the smallest possible battery for his or her needs. When not used, the headset 1 is stowed in the headset carrying device 40 and recharged. The combination of a charger and a protective casing in a headset carrying device 40 is advantageous, since the headset generally has to be placed or stowed somewhere when not used. Furthermore, when devised to be used with mobile communication terminals, or with different communication terminals located at different places, some sort of clip solution is desirable for carrying the headset 1 when not in use. Such a clip solution, if integrated with the headset, would make the headset both larger and heavier.

Figure 8:
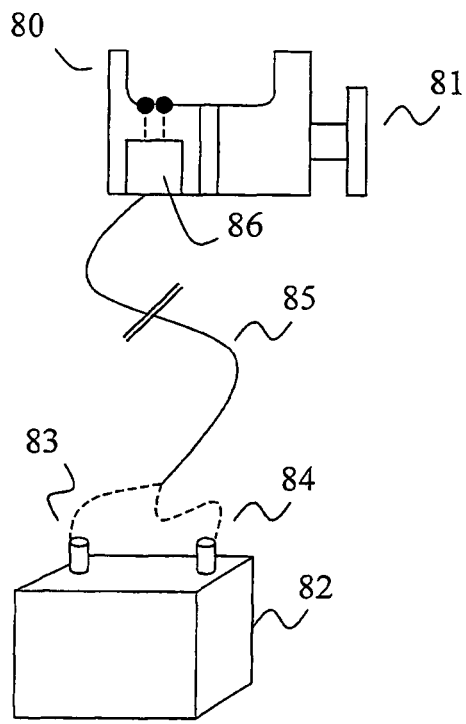
FIG. 8 schematically illustrates a headset carrying device for vehicle installation, according to an embodiment of the invention.

FIG. 8 illustrates a different embodiment of the headset carrying device according to the invention. The headset carrying device 80 is adapted for vehicle use, such as in a car, where it can be conveniently attached e.g. to the dashboard by use of attaching means 81. The outer and preferably plane surface of the attaching means 81 may be coated with an adhesive layer or a magnet. Alternatively, the attaching means 81 may comprise a pair of co-operating members, of which one is basically permanently fixed in the vehicle, whereas the other member is fixed to the headset carrying device 80, such that the headset carrying device 80 can be released from the vehicle. In such an embodiment the headset carrying device 80 may also include a protective casing, though none is illustrated in FIG. 8. The headset carrying device 80 makes use of the existing power supply of the vehicle, e.g. the car battery 82 or the generator, for charging the second power supply or charger 86. FIG. 8 illustrates a typical embodiment where the headset carrying device 80 is connected to the poles 83, 84 of the car battery 82, through a wire connection 85. The wire connection 85 may be direct, but alternatively the headset carrying device 80 is connectable to the car battery through some sort of releasable connector (not shown). This connector may e.g. be attachable to a standard 12 volt cigarette lighter output. In this vehicle-adapted embodiment the second power supply 86 may also include a voltage transformer 86, such that a suitable charging voltage for the second power supply is obtained. Needless to say, the embodiment of FIG. 8 is equally applicable to other types of vehicles having an electrical power supply, such as boats, aeroplanes etc.

Figure 9:
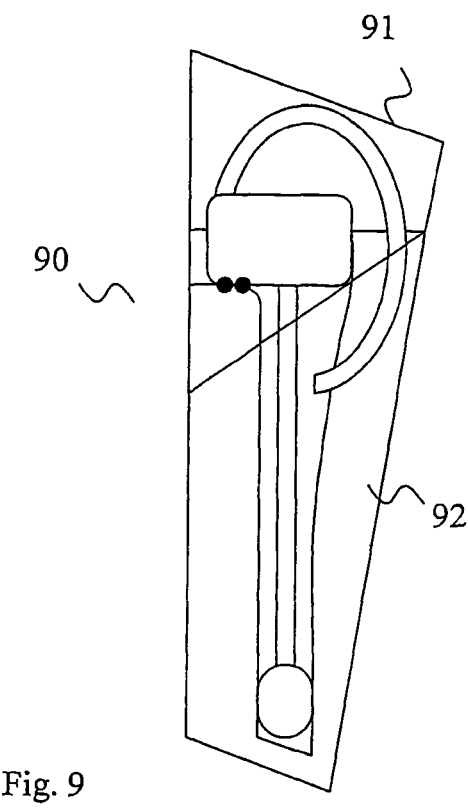
FIG. 9 schematically illustrates a headset carrying device according to another embodiment of the invention, with a headset placed therein.
Figure 10:
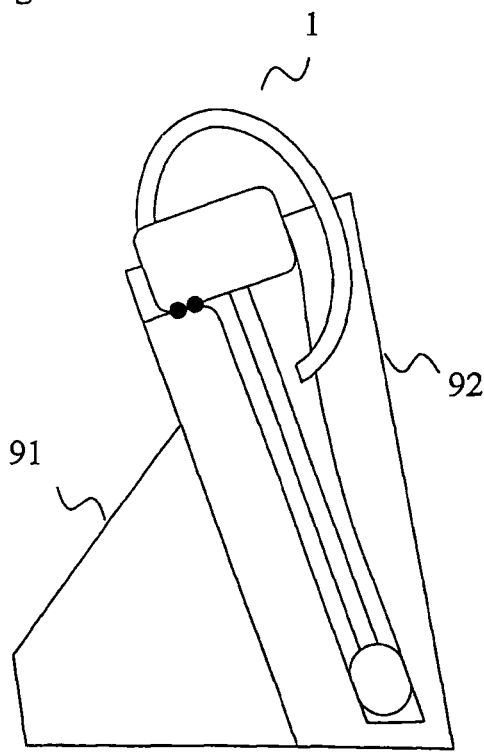
FIG. 10 schematically illustrates the headset and headset carrying device of FIG. 9, when arranged in a desktop mode.
Figure 11:
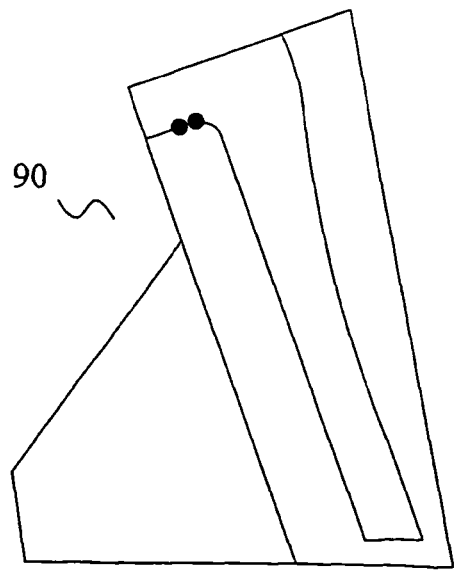
FIG. 11 schematically illustrates the headset carrying device of FIG. 9 in desktop mode, without headset.

FIGS. 9-11 illustrate yet another embodiment of the invention. Herein, a headset carrying device 90 is included, much like in FIG. 3. Furthermore, the headset carrying device 90 also includes a power supply, leads and connectors as illustrated in FIG. 3 and described with reference thereto, but these elements are left out in FIGS. 9-11 for the sake of clarity. The headset carrying device 90 includes the further feature that it is foldable into a desktop mode, in which it can be conveniently placed on a flat horizontal surface, such as a table. This feature is illustrated in FIG. 10 with a headset 1 placed in the headset carrying device 90, and in FIG. 11 only showing the headset carrying device 90. According to the illustrated embodiment, the desktop mode is obtained by fully opening the pivotable lid 91 of the box 92, such that the upper surface of the lid 91 becomes a resting surface for the headset carrying device 90. Optionally, the second power supply, i.e. the charger implemented in the headset carrying device 90, may be connectable to a mains outlet, preferably via a cord. This way, the second power supply may also be conveniently charged when arranged in the desktop mode.

Figure 6:
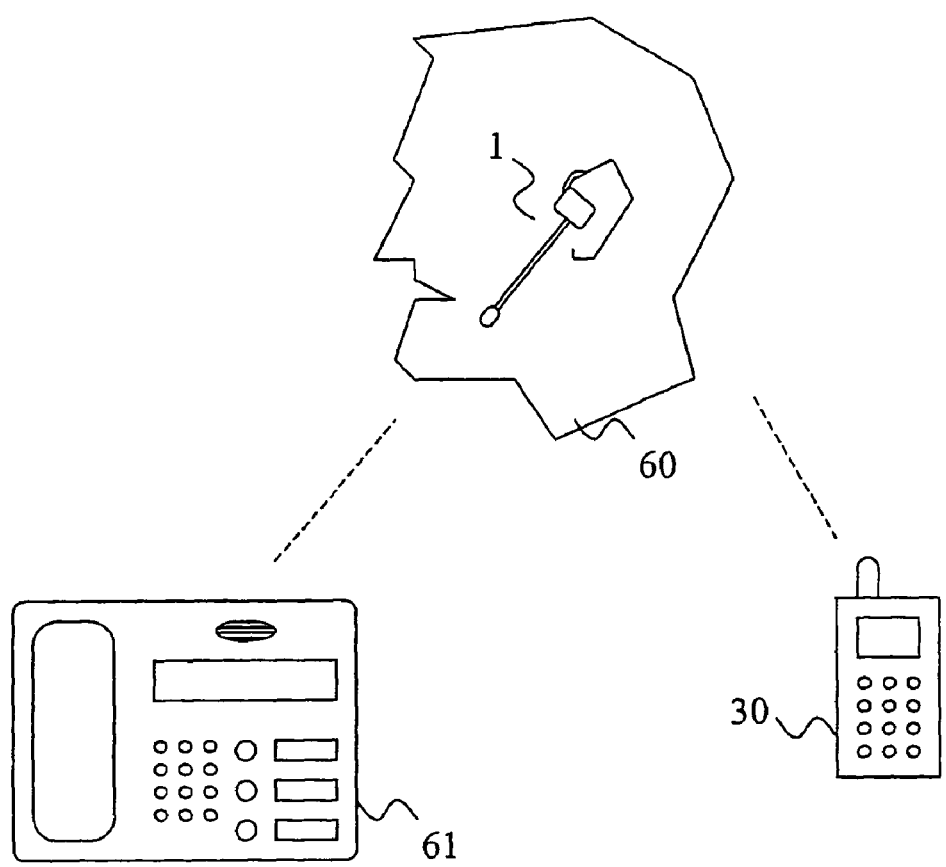
FIG. 6 schematically illustrates the use of a cordless headset for different communication terminals.

According to the invention, the present invention consequently relates to a headset system, including a headset 1 and a headset carrying device 40, wherein the power supply capacity is split between there between. The headset carrying device 40 is preferably devised with attaching means to be worn on the body of the user, such as a belt clip, a necklace or a clip to be attached to the clothes. Alternatively, the headset carrying device may be devised to be placed on or mounted to another object. Since a headset 1 for which the present invention can be implemented may be useable for communication through many different communication terminals, in the case of a bluetooth implementation any communication terminal supporting the relevant bluetooth profile, it is advantageous not to have a battery charger function 41 confined to one of those communication terminals. FIG. 6 illustrates a user 60 wearing a headset 1 with bluetooth transmission capabilities. The headset 1 is communicatively connectable by bluetooth to a mobile phone 30, for further communication through a mobile phone network. Furthermore, the same headset 1 is communicatively connectable by bluetooth to a PSTN or IP phone 61 in e.g. the user's office or home. Correspondingly, the headset 1 may be connectable to several other communication terminals, mobile or stationary. However, as the skilled person will realise, a headset communicatively connectable to different terminals does not have to use the same transmission interface towards those different terminals. Nevertheless, by providing a special headset carrying device 40 which is separate from the communication terminal, and which preferably also has a protective casing or structure 47, a headset system according to the invention is suitably adapted to ease of use, due to the low weight of the headset 1, safe and easy storage during non-use and transport, and a long battery time. The power supply unit of the headset is preferably dimensioned to last for a short period of use of communicating audio data, converting between audio data and audio signals, and conveying audio signals, before re-charging is necessary. The headset talk-time may be between zero and two hours, but preferably the headset should have a talk-time in the approximate range of 30 to 60 minutes. This short period will in most cases be enough to last for at least one telephone call, before re-charging of the power supply unit is needed, but not much more. This way, the power supply unit can be made very small with low weight. Preferably, the headset carrying device should be able to charge the headset power supply at least 10 times, before the second power supply of the headset carrying device must be charged or replaced. Consequently, the headset carrying device is preferably able to provide about 600 minutes of talk-time to the headset.

The foregoing has described the principles, preferred embodiments and modes of operation of the present invention. However, the invention should not be construed as being limited to the particular embodiments discussed above. For example, the headset carrying device 40 may simply comprise the charger 41 and means for connecting the headset 1 to the headset carrying device 40, without any particular protective casing. The headset carrying device 40 of such an embodiment could of course be much smaller than that of the drawings, and e.g. be provided in a necklace. Thus, the above-described embodiments should be regarded as illustrative rather than restrictive, and it should be appreciated that variations may be made in those embodiments by workers skilled in the art without departing from the scope of the present invention, as defined by the following claims.

The invention claimed is:

1. A headset system, comprising:
   a headset for direct wireless communication of audio data with a communication terminal and including a first power supply unit;
   a headset carrying device; and
   a charger for charging the first power supply unit from a second power supply unit, wherein the headset carrying device comprises the charger and the second power supply unit, and wherein the headset carrying device is separate from the communication terminal and is devoid of a holding member or chamber for holding the communication terminal.

2. The headset system as recited in claim 1, wherein the headset carrying device comprises a protective casing for the headset stowed therein.

3. The headset system as recited in claim 1, wherein the headset carrying device comprises attaching means for attaching to a user's body or clothes.

4. The headset system as recited in claim 1, wherein the headset carrying device comprises attaching means for mechanically attaching the headset carrying device to a vehicle, and for electrically attaching the charger of the headset carrying device to a power supply of the vehicle.

5. The headset system as recited in claim 1, wherein the first power supply unit is a re-chargeable battery.

6. The headset system as recited in claim 1, wherein the first power supply unit is a large-capacity capacitor.

7. The headset system as recited in claim 1, wherein the charger is a re-chargeable battery.

8. The headset system as recited in claim 1, wherein the charger is a large-capacity capacitor.

9. The headset system as recited in claim 7, wherein the charger is connectable to a vehicle battery for recharging of the charger.

10. The headset system as recited in claim 1, wherein the charger is a primary cell battery.

11. The headset system as recited in claim 1, wherein the first power supply unit is diminished to provide power for a short period of use of communicating audio data, converting between audio data and audio signals, and conveying audio signals, before re-charging is necessary.

12. The headset system as recited in claim 11, wherein the short period is in the range of about zero to two hours.

13. The headset system as recited in claim 11, wherein the short period is in the range of about thirty minutes to one hour.

14. A headset carrying device for carrying a headset when the headset is not in use, the device comprising:

an electrical charger and means for establishing electrical contact between the charger and a first power supply unit of a headset carried by the headset carrying device, the electrical charger being configured to charge the first power supply unit from a second power supply unit, wherein the headset carrying device includes the second power supply unit and is separate from a communication terminal and devoid of a holding member or chamber for holding the communication terminal to which the headset is communicatively connectable.

15. The headset carrying device as recited in claim 14, further comprising a protective casing for a headset stowed therein.

16. The headset carrying device as recited in claim 14, further comprising a casing for stowing a headset, wherein the casing is transformable into a desktop mode configured to position the device on a horizontal surface.

17. The headset carrying device as recited in claim 14, further comprising attaching means for attaching the headset carrying device to a user's body or clothes.

18. The headset carrying device as recited in claim 14, further comprising attaching means for mechanically attaching the headset carrying device to a vehicle, and for electrically attaching the charger of the headset carrying device to a power supply of said vehicle.

19. The headset carrying device as recited in claim 14, further comprising headset securing means for mechanically retaining a headset stored therein.

20. The headset carrying device as recited in claim 19, wherein the headset securing means is configured to maintain electrical contact between co-operating contacting means for the charger and the power supply unit.

21. A headset system, comprising:

a headset for direct wireless communication of audio data with a communication terminal and including a first power supply unit;

a headset carrying device configured to hold at least a portion of the headset therein; and a charger for charging the first power supply unit from a second power supply unit, wherein the headset carrying device comprises the charger and the second power supply unit, wherein the headset carrying device is separate from the communication terminal and is configured to carry substantially only the charger, the second poser supply unit, and the headset with the first power supply unit.

22. A headset system of claim 1, wherein the headset carrying device comprises a compact case sized and configured so that a boundary of the compact case substantially corresponds to a length and/or a width of the headset, the compact case having an elongated bore configured to receive a first portion of the headset therein and a lid pivotally hinged on the case and movable between an open and a closed position, the lid being configured to enclose a second portion of the headset when the lid is in the closed position.

* * * * *